Aug. 25, 1959
L. L. ANDERSON
2,901,277
LATCH MECHANISM
Filed Dec. 11, 1956
2 Sheets-Sheet 1
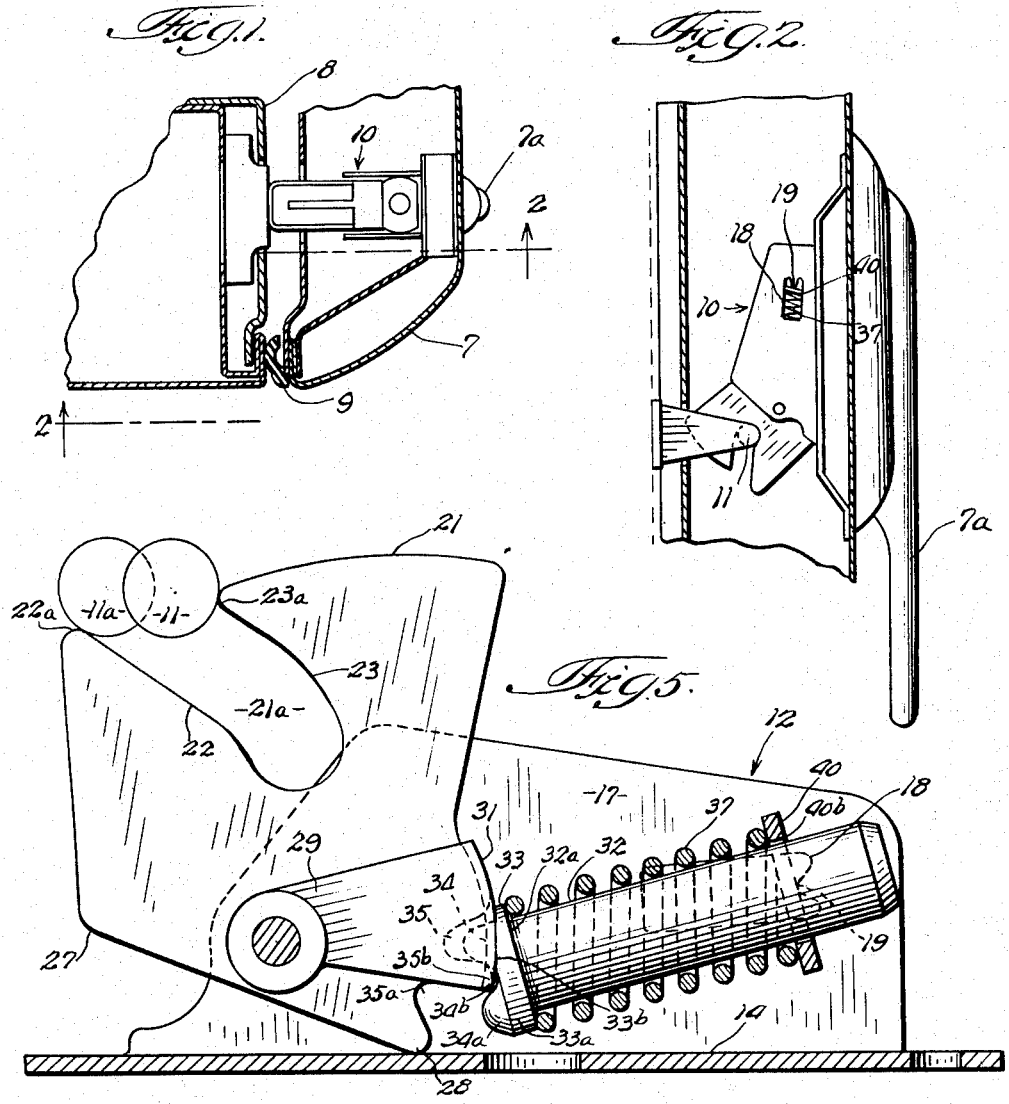
INVENTOR.
Lloyd L. Anderson
BY
Thiess, Olsen, Mecklenburger, van Holst, & Coltman.

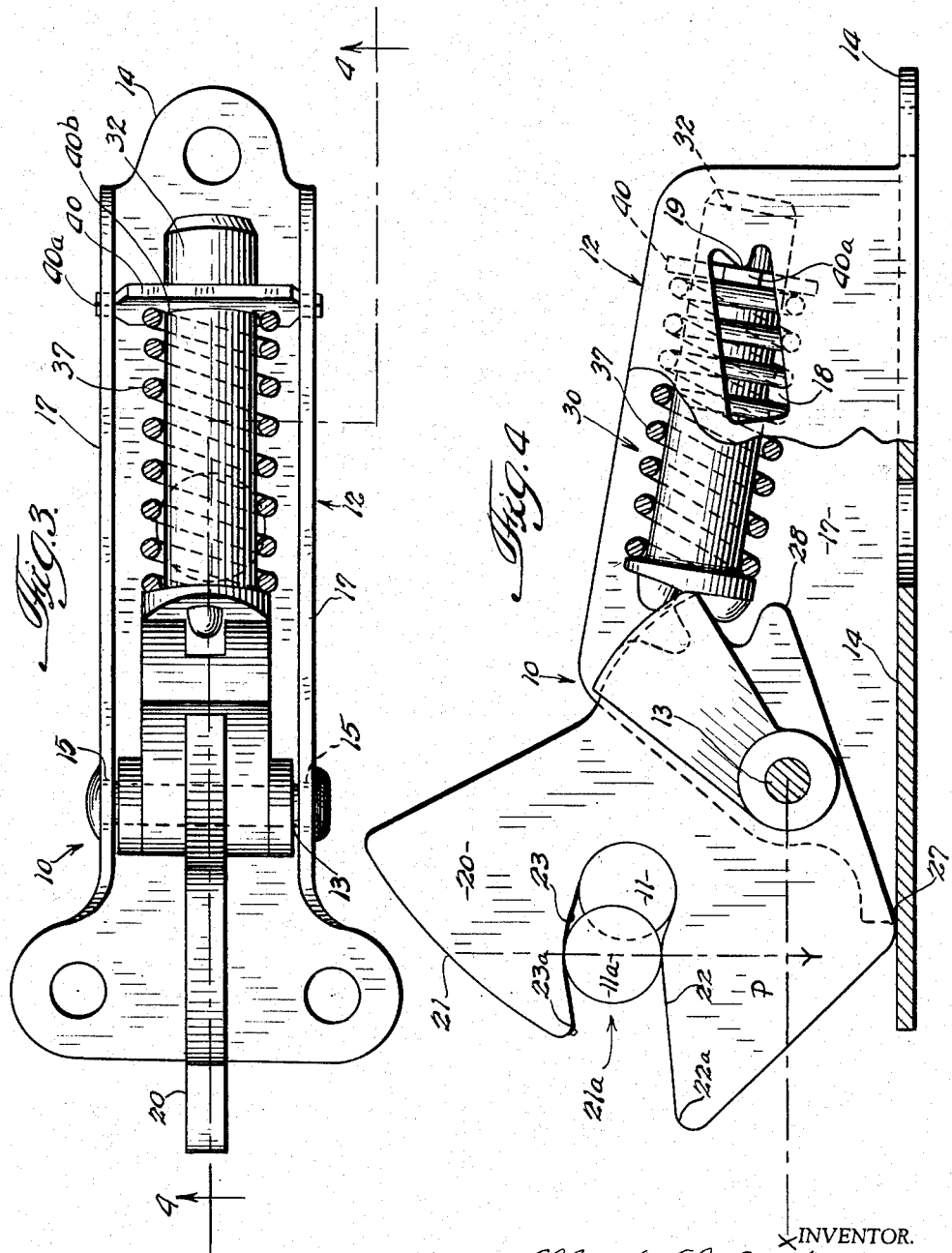

_United States Patent Office_

2,901,277
Patented Aug. 25, 1959

2,901,277

LATCH MECHANISM

Lloyd L. Anderson, Grand Rapids, Mich., assignor to Jervis Corporation, Grandville, Mich., a corporation of Michigan Application December 11, 1956, Serial No. 627,593

19 Claims. (Cl. 292—78)

This invention relates to a latch mechanism and more particularly to a latch mechanism of the toggle type.

The latch mechanism of this invention is particularly well adapted for use in connection with a refrigerator door and cabinet, but it is to be understood that this invention may be applied to latches which are used in conjunction with a variety of closure structures and certain featured portions of the mechanism may be employed in mechanical devices unrelated to latching. Latches incorporating the features of this invention may be used in combination with low gasket sealing loads and may be operated by a fixed handle, although loads of any desired magnitude may be obtained by simple structural changes, and a lever type cocking handle may be used to operate the latch.

In prior years, latches used in refrigerators were required to produce gasket pressures in the order of 40 to 90 pounds. This was necessary in order to provide an effective peripheral closure seal. However, with the development of new soft gaskets, the required draw-in force has been reestablished within the much lower force range of between 8 and 16 pounds. This lower latching force range not only maintains an effective peripheral seal but also permits the use of a nonlocking latch enabling the door to be opened either by pulling on the handle from the outside or pushing on the door from the inside. Such a nonlocking or push-out type latch mechanism should, of course, be constructed such that it is safely operable with normal manufacturing tolerances and with slight flexure of the door under load.

Latches of the toggle type generally operate by means of spring actuation. The bolts of these latches are pivotally rotatable between two predetermined positions, one of which is a keeper-receiving or cocked position and the other of which is a latched or uncocked position. In traveling between these two positions the bolt must pass through a center or neutral position. Extraneous force must be applied to the bolt to rotate it from one predetermined position into this center position, but once over center the spring of the toggle mechanism takes over to urge the bolt into the other predetermined position. Thus, in prior latches the distance of over-center travel into the receiving and latched positions governed the degree of spring relaxation in each of these positions and, therefore, also governed the amount of force required to rotate the bolt from these positions through the center position against the resistance of the actuator spring, i.e., the amount of force required to latch and unlatch the mechanism.

It has long been recognized that the ideally constructed refrigerator latch should provide sufficient keeper draw-in and holding forces to effect the proper peripheral gasket seal and yet should allow the door to be closed with very little push or extraneous force being exerted by the user. Such a mechanism would require an unbalance of torque forces since more extraneous force would be required to cock the latch (open the door) than to uncock the latch (close the door). Various latches have been designed which have produced such an unbalanced torque arrangement, but none of these has been completely satisfactory.

One recent solution to this unbalanced torque problem has been through the use of magnetic doors and gaskets. However, in latch mechanisms of the toggle type, this unbalanced torque force was created by limiting the amount of over-center travel into the cocked or keeper-receiving position. This meant that the amount of bolt rotation into this position had to be restricted in order that a low extraneous force could uncock the mechanism and actuate the latching cycle. With the rotation of the bolt being restricted such that very little movement would actuate the latch, it is evident that very close clearances between the bolt and keeper were required to insure proper operational latching and unlatching. Consequently very rigid assembly and manufacturing tolerances were required in connection with both the latch and the closure structure upon which the latch was used.

It is one particular object of this invention to provide a toggle type mechanism which will permit liberal over-center travel with only a slight relaxation of the actuating spring forces, thereby requiring less force to return the bolt to the dead-center position.

It is another object of this invention to provide a toggle type latch mechanism which has an unbalanced torque arrangement whereby a greater force is required to cock than to uncock the latch.

It is another object of this invention to provide a low closing force toggle-type latch mechanism which will allow liberal assembly and manufacturing tolerances and which will allow for major differences in the relative positions of the latch and keeper.

It is still another object of this invention to provide a nonlocking toggle type latch mechanism which will have sufficient latching force and yet which will allow the door to which it is attached to be closed with very little effort on the part of the user.

It is a further object of this invention to provide a latch mechanism which can be easily pushed open by a child trapped inside of the refrigerator.

It is a still further object of this invention to provide a latch mechanism which produces a constant and uniform keeper holding force, whereby the same force is required to push or pull open the door to which the mechanism is attached, regardless of the position of the keeper within the latch bolt.

It is also an object of this invention to provide a low closing force toggle type latch mechanism which will allow for major differences in the relative positions of the latch and keeper and which exerts a constant and uniform holding force on the keeper when it is latchingly engaged.

It is an additional object of this invention to provide a mechanism which is simple in construction, inexpensive to manufacture, yet efficient and effective, for producing a positive gasket seal.

Other objects and advantages may be seen and a fuller understanding of the invention may be had by referring to the following description and claims taken in conjunction with the accompanying drawings.

One important feature of this invention is the construction of the keeper-receiving slot of the latch bolt. This slot is arcuately shaped, such that the holding force exerted against the engaged keeper will be uniform and constant regardless of the position of the keeper within the slot. Such a configuration also yields an unusually large slot or keeper-receiving mouth which permits normal latch operation even when there is considerable variation in the relative engaging positions of the keeper and bolt.

Another important feature of this invention is the construction of the toggle mechanism used in conjunction with the latch bolt. By a novel combination of cooperatively engaging bolt and bolt actuator surface configurations, and by a novel means for maintaining these surface configurations in working relationship, the amount of relaxation of the actuator spring may be rigidly and easily controlled.

Another feature of this invention is the use of an actuator pivot plate. This plate is adapted to support the actuator spring and to operatively pivot on V-edges which are provided within opposing apertures in the frame of the latch mechanism. This produces a very simple, inexpensive, and friction-free pivotal frame connection for the bolt actuator.

For a more complete understanding of this invention reference will now be made to the accompanying drawings in which:

Figure 1 is a top plan view of a latch mechanism incorporating the features of the present invention mounted in a refrigerator door;

Fig. 2 is a side elevational view of the latch mechanism and the refrigerator door taken substantially on line 2—2 of Fig. 1;

Fig. 3 is an enlarged top plan view of the latch mechanism with the bolt in the latched position;

Fig. 4 is a side elevational view of the latch mechanism taken substantially on line 4—4 of Fig. 3; and Fig. 5 is a side elevational view of the latch mechanism with the bolt in the keeper-receiving position.

With more particular reference to the drawings, a latch mechanism 10 is provided which is adapted to latchingly engage a keeper 11. As shown in Figs. 1 and 2, the latch mechanism 10 may be housed within the refrigerator door 7 and the keeper 11, which is preferably a strike roller, may be mounted on the refrigerator pilaster 8. It is, of course, possible to reverse this mounting arrangement.

The latch is adapted, by means hereinafter described, to latchingly engage keeper 11 and to provide an efficient and constant pressure upon sealing gasket 9, regardless of the position of the engaged strike roller 11 within the latch bolt. A fixed handle 7a is preferably provided in combination with this latch mechanism although an operating handle arrangement could easily and obviously be provided.

As best shown in Figures 3 and 4, latch mechanism 10 includes a sheet metal supporting frame 12, which is substantially channel shaped, having a bottom portion 14 and side walls 17. A bolt 20 is pivotally mounted within channel-shaped frame 12 by means of pin 13, which extends through oppositely disposed holes 15 in the frame walls 17. Thus mounted, bolt 20 is adapted to rotatably move between the uncocked and cocked positions shown respectively in Figs. 4 and 5.

A bolt actuating means 30 is pivotally mounted on supporting frame 12 by means of a spring supporting pivot plate 40 having end flange portions which extend through oppositely disposed apertures 18 in frame walls 17 and operatively pivot upon protuberant V-portions 19. Another portion of bolt actuating means 30 is adapted to operatively engage bolt 20 to urge said bolt into one or the other of its two predetermined positions.

Referring to Fig. 4, the latch bolt 20 which may be constructed of a suitable material such as nylon has a forward camming nose 21. A keeper-receiving slot 21a is provided which extends from the lower portion of camming nose 21 into the interior of the latch bolt. An adjacent keeper-contacting or latch-actuating surface 22 forms the lower portion of slot 21a and is adapted to provide initial contact for keeper 11 for uncocking the mechanism and actuating the latching cycle. Forming the upper portion of receiving slot 21a is arcuately-shaped keeper-engaging cam surface 23.

Cam surface 23 is in the form of an arc which is struck from point P. Point P is located on line X, which is normal to the desired draw-in force direction of latch bolt 20 upon keeper 11 and bisects the pivotal axis of pin 13 of the latch bolt. In order to produce a latch mechanism which does not positively lock, i.e., which may be pushed or pulled open without an operating handle mechanism, it is necessary that the force applied to the keeper by the bolt pass through a point which is located exterior (to the left in the drawings) of the pivotal axis of the latch bolt. Of course the greater the distance between this point and the pivotal axis of the bolt, the less is the torque effect of the spring biased actuator 30. It is preferred that point P also be located exterior of the pivotal axis of the latch bolt.

In the presently illustrated latch mechanism, the desired direction of draw-in and holding force is perpendicular to the base portion 14 of frame 12. Thus, the arc of cam surface 23 is struck from a point on the line which is parallel to base portion 14 and which bisects pivot pin 13. Such an arrangement with minor changes for frictional influences will produce upon keeper 11 a uniformly constant holding force which is perpendicular to base portion 14. The holding force is that force exerted upon the keeper after the keeper is fully latched and the bolt rotation has ceased.

The theoretical location on line X of the point P from which the arc for cam surface 23 is struck is the point of intersection of line X with a line Y which is normal thereto and which passes through the center of the keeper in its most extreme outwardly disposed latchingly engaged position 11a, as seen in Fig. 4. It must be emphasized that this is a theoretical location, and as a practical matter, with frictional influences considered, it has been found that an even more uniform draw-in force may be had by placing point P on line Y slightly above the intersection of this line with line X. Again it must be pointed out, however, that the invention rests broadly in describing the arc for cam surface 23 from any point located substantially on line X. By substantially is meant to include placement of point P either slightly above or slightly below line X as an accommodation for frictional influences. Also, it is evident that cam surface 23 need be so arcuately shaped only in that portion which contacts the keeper after the keeper is fully latched. Thus portion 23a of this cam surface could be other than arcuate.

The intersection of bolt camming nose 21 with arcuate receiving slot 21a yields a very wide keeper-receiving mouth, as shown in Fig. 5, where the keeper is varied from position 11 to position 11a between portions 22a and 23a of the latch bolt. In the illustrated embodiment, keeper 11 is just clearing the nose 21 of the bolt, whereas the keeper in position 11a is clearing nose 21 by as much as one-fourth of an inch. This feature of a wide keeper-receiving mouth permits not only liberal assembly and manufacturing tolerances, but also permits flexure of the refrigerator door and hinges due to loading of the door with milk bottles and other weighty items.

It may be seen that latch bolt 20 is adapted to rotate about pivot pin 13 between the uncocked or latched position, shown in Fig. 4, and the cocked or receiving position, shown in Fig. 5. The uncocked and cocked positions are determined by the abutting of bolt portions 27 and 28, respectively, with the bottom portion 14 of the supporting frame.

Bolt actuating means 30 engages arcuately-shaped bolt surface 31 to urge bolt 20 into one of its predetermined positions. Surface 31 may be protected from wear by a steel support 29. Spring guide actuator shaft 32 is adapted to carry coil spring 37, which resiliently abuts against the rear or shoulder portion 32a of plate 33. Surface portion 33a of plate 33 may be in a plane which is parallel to the plane of the rear portion 32a of plate 33 and normal to the longitudinal axis of actuator shaft 32, while bolt-contacting surface portion 33b of plate 33 may be tapered toward the rear or spring abutting side 32a of plate 33. Rising from the surfaces of plate 33 are adjacent protuberances 34 and 34a forming between them concaved portion 34b. Apertures 35 and 35a are provided within latch bolt 20 and are adapted to receive protuberances 34 and 34a respectively of the bolt actuator. The portion of the bolt 35b between apertures 35 and 35a is adapted to seatingly engage concave portion 34b of the bolt actuator.

Thus, the cooperative combination of the protuberances 34 and 34a of the bolt actuator with the apertures 35 and 35a of the bolt provides a simple yet efficient means for maintaining a pivot connection between the bolt and bolt actuating means as well as maintaining cam surfaces 31 of the bolt and 33b of the bolt actuating means in proper working relationship. Spring 37, which is compressed between pivot plate 40 and the shoulder portion 32a of spring guide plate 33, maintains the engagement between the bolt and the bolt actuating means. It may be seen that the respective shapes of cam surfaces 31 of the bolt and 33b of the bolt actuator may be greatly varied, and other means may be employed to keep these surfaces in working relationship.

Actuator shaft 32 is slidably mounted in pivot plate 40 which has a hole 40b through which the rear of the actuator shaft passes. Laterally extending flange portions 40a, integral with pivot plate 40, are adapted to extend through apertures 18 in the walls 17 of the frame, and to operatively engage and pivot upon protuberant V-portions 19.

In the embodiment shown in the drawings, the cooperating surfaces 31 of the bolt and 33b of the bolt actuating means permit greater relaxation of spring 37 in the uncocked or latched position (Fig. 4) than is permitted in the cocked or receiving position (Fig. 5). The amount of spring relaxation permitted in the receiving position is, however, not dependent upon the amount of over-center travel of the latch bolt as was the case in previously designed latches of the toggle type. The bolt of the illustrated mechanism in fact travels much farther over center than in the usual toggle mechanism, and were it not for these cooperatively engaging surfaces of the bolt and bolt actuator an exorbitant amount of force would be required to return the bolt from the cocked to the dead center position. By mechanically restricting the amount of spring energy release, the amount of force required to again compress the spring is correspondingly lessened.

In the common toggle mechanism portion 35b of the bolt would always be in seating engagement with concave portion 34b and this results in a simple pivot connection. In applicant's toggle mechanism coacting surfaces 31 of the bolt and 33b of the bolt actuating means are added. By virtue of the ordinary toggle pivot the relationship between these surfaces is maintained such that certain points on these opposing surfaces are adapted to rollably contact each other as the bolt and actuator move between the cocked and the center positions. Thus, there is present in applicant's toggle mechanism a combination of pivot and rolling contact between the bolt and bolt actuator.

It is preferred that only pivot contact be experienced in applicant's latch mechanism as the bolt and actuator travel between the center and the uncocked positions. This yields an ordinary toggling effect with the amount of relaxation of spring 37 being dependent upon the amount of over-center travel and permits the full and conventional forces of the spring to be expended in the latching action. However, between the center and the cocked positions there is rolling contact. The engagement of surface 31 of the bolt and surface 33b of the actuator prevents bolt portion 35b from completely seating in concave portion 34b of the actuator when the mechanism is cocked. The relaxation or extension of spring 37 is thus restricted by an amount approximately equal to the distance which actuator portion 34b must travel to fully straddle and engage portion 35b of the bolt.

It must be apparent that various combinations of contact engagement could be provided between the bolt and bolt actuator. Rolling contact could be entirely substituted for pivot contact and the energy release of spring 37 governed solely by the shapes of the engaging cam surfaces over the entire operating range of the mechanism.

With a mechanism constructed in accordance with this invention the force requirements may even be reversed. That is, the amount of spring energy release may be greater in the receiving position than in the latched position. This may be accomplished without varying the amount of over-center travel in each position, by merely changing slightly the configurations of the cooperatively engaging surfaces of the bolt and bolt actuator.

Thus a latch mechanism may be constructed which would require less force to open than to close notwithstanding that a greater over-center travel would be experienced in the latched position than in the receiving position. This operation would of course be impossible with previously designed latch mechanisms in which the amount of spring energy release depended completely on the amount of over-center travel of the bolt and actuating means.

It is apparent that since the energy release of the spring may be governed solely by the shapes or contours of the engaging cam surfaces, the bolt and bolt actuator could be designed to move to and stop in any one of an infinite number of intermediate positions, should such operation be found desirable. Such intermediate positions would be provided by shaping the contacting surfaces of the bolt and bolt actuating means such that a certain amount of spring relaxation would be permitted at each of these intermediate points.

As previously stated, portions of the described mechanism may be used in connection with other types of mechanisms which are unrelated to latching. This may be true of the keeper engaging cam surface 23 and the pivot plate 40, but it is especially true of the actuating means 30. A spring biased toggle lever having such novel means for controlling the torque output of the pivoted rotatable member or bolt will have other uses obvious to a person skilled in the mechanical arts. The term bolt may thus be understood to include any pivoted rotatable member such as a keeper, a latch bolt, or other which is urged into a predetermined position by a toggle type actuator.

In operation, when the refrigerator door 7 is open, the latch mechanism is in the keeper-receiving position, shown in Figure 5. As the door is closed, strike roller 11 engages latch actuating cam surface 22 and rotates latch bolt 20 in a counter-clockwise direction against the resistance of spring 37 of the bolt-actuating means 30. As this counterclockwise rotation continues to be produced by the action of the keeper on cam surface 22 the engaging surfaces 31 of the bolt and 33b of the bolt actuator which rollably contact each other gradually permit the bolt portion 35b to move into seating engagement within concave portion 34b of the actuator until the bolt-actuating means 30 just passes over center. At that point, bolt portion 35b has seated within actuator concave portion 34b and spring 37 takes over to urge the latch bolt strongly in a counterclockwise direction causing actuator portion 34b to pivot about bolt portion 35b and the bolt to move into its ultimate latched position, shown in Figure 4.

The arcuate shape of cam surface 23 of the latch bolt causes the holding force upon the keeper to be uniform regardless of whether the keeper 11 is in its normal position or in a substantially different position 11a.

The engaging cam surfaces 31 of the bolt and 33b of the bolt-actuating means are of such configurations as to allow considerable rotation of the bolt between the cocked and center positions while requiring very little compression of the actuating spring 37.

The refrigerator door may be opened either by pulling on the fixture handle from the outside or by pushing from within. In opening, keeper 11 bears against arcuately shaped cam surface 23 rotating the bolt in a clockwise direction from its latched position. Extraneous force supplied by either pulling on the door handle from the outside or pushing on the door from the inside is required to produce this rotation against the resistance of spring 37 until such time as the bolt and bolt-actuating means pass over center. At this point, spring 37 again takes over this time to gently rotate the bolt in a clockwise direction into the ultimate receiving or unlatched position, shown in Fig. 5.

The amount of force expended in rotating from the center to the receiving position, however, is not determined by the amount of over-center travel. As the mechanism passes over center into the receiving position, surfaces 31 of the bolt and 33b of the actuator again rollably contact to move portion 35b of the bolt out of seating engagement with concave portion 34b of the actuator. The further over-center the actuator and bolt move, the greater becomes the distance by which these two seating portions are separated. Thus, the over-center tendency for the spring to extend is controlled by the engaging surfaces 31 and 33b. As previously stated, over-center extension of the spring may, if desired, be completely eliminated.

If the door is opened and the bolt 20 is accidentally in some manner snapped to the latched position, cam nose 21 is constructed such that when coming in contact with the keeper, the bolt will be rotated clockwise against the resistance of spring 37 into the keeper-receiving position. Further closing of the door will cause the bolt to be returned to its latched position with the keeper engaged.

Although I have described my invention with a certain degree of particularity, it is understood that the present disclosure has been made only by way of example and that numerous changes in the details of construction and the combination and arrangement of parts may be resorted to without departing from the spirit and scope of the invention, as hereinafter claimed.

I claim:

1. In a latch mechanism which exerts a draw-in and holding force upon a keeper, a supporting frame, a bolt member pivotally connected to said frame and rotatably movable with respect to said frame between at least two predetermined positions, one of said positions being a latched and the other an unlatched position, said bolt-member including an arcuately shaped element adapted to engage the keeper, the forces acting on the engaged keeper through said element when the bolt is in the latch position being substantially constant regardless of the location of the point of engagement between said element and the keeper, bolt actuating means pivotally connected to said frame and operatively engaging said bolt to urge said bolt into one of its predetermined positions, said actuating means having a cam surface rollably engaging said bolt member to urge said bolt member selectively into its predetermined positions, the contour of said cam surface being determinative of the energy release of said actuating means in at least one of said positions.

2. In a latch mechanism of the non-locking type which is adapted to receive and exert a draw-in and holding force upon a keeper, a supporting frame, a bolt member pivotally connected to said frame and rotatably movable with respect to said frame between at least two predetermined positions, one of which is a keeper engaging position, said bolt member including an arcuately shaped keeper-engaging element, the arc of said element being generated from a point which when the bolt is in the keeper-engaging position is located substantially on that line which is normal to the direction of desired keeper draw-in and holding force and which passes through the pivotal axis of the bolt, bolt actuating means pivotally connected to said frame and operatively engaging said bolt to urge said bolt into one of its predetermined positions, said actuating means having a cam surface rollably engaging said bolt member to urge said bolt member selectively into its predetermined positions, the contour of said cam surface being determinative of the energy release of said actuating means in at least one of said positions.

3. In a mechanism of the character described, a supporting frame, a bolt member pivotally connected to said frame and rotatably movable with respect to said frame between at least two predetermined positions, a bolt actuating means including a spring biased element having a cam surface which is maintained in working relationship with respect to and is adapted to rollably contact a corresponding surface portion of said bolt member, said actuating means pivotally connected to said frame and operable to resiliently urge said bolt into one of its predetermined positions, the contour of the cam surface of said element being determinative of the energy release of the actuating means in at least one of said predetermined positions.

4. In a mechanism of the character described, a supporting frame, a bolt member pivotally connected to said frame and rotatably movable with respect to said frame between at least two predetermined positions, a bolt actuating means including a spring biased element having a cam surface which is adapted to rollably contact a corresponding surface portion of said bolt member, said actuating means being pivotally connected to said frame and operable to resiliently urge said bolt into one of its predetermined positions, both the location of and the actuator spring energy release in at least one such predetermined bolt position being dependent upon the contour of said cam surface and the corresponding engaging surface portion of said bolt member.

5. In a mechanism of the character described, a supporting frame, a bolt member pivotally connected to said frame and rotatably movable with respect to said frame between at least two predetermined positions, a bolt actuating means pivotally connected to said frame and operable to resiliently and selectively urge said bolt into its predetermined positions, said bolt actuating means including a spring biased cam element a surface portion of which is adapted to rollably engage a corresponding surface portion of said bolt member, the bolt surface portion being in the shape of an arc which is generated from the pivotal axis of the bolt, the configuration of the contacting surfaces of said cam element and said bolt member being determinative of the amount of force required to rotate the bolt from one of the predetermined positions to another.

6. In a mechanism of the character described, a supporting frame, a bolt member pivotally connected to said frame and rotatably movable with respect to said frame between a stable uncocked and a stable cocked position through an unstable center position, a bolt actuating means pivotally connected to said frame and operable to resiliently urge said bolt into one such position, said bolt actuating means including a spring biased cam element having a surface portion which is adapted to rollably contact a corresponding surface portion of said bolt member, the amount of force required to rotate the bolt from the cocked to the uncocked position being dependent upon the distance of travel necessary to reach the unstable center position from the stable cocked position, and the amount of force required to rotate the bolt from the uncocked position to the cocked position being dependent upon the configurations of the cam element and the engaging surface of the bolt.

7. In a mechanism of the character described a supporting frame, a bolt member pivotally connected to said frame and rotatably movable with respect to said frame between at least two predetermined positions, one such position being a latched position and the other being an unlatched position, a bolt actuating means pivotally connected to said frame and operable to resiliently urge said bolt into one of its predetermined positions, said bolt actuating means including a spring biased element constantly in engagement with a portion of said bolt member, said element and the engaged portion of said bolt having surface portions so shaped and so positioned that they rollably contact each other to prevent excessive spring energy release as the bolt and actuating means move into the unlatched position, means cooperating with the contacting surface portions of said bolt and actuating means to maintain these surfaces in substantial working relationship.

8. In a mechanism of the character described a supporting frame, a bolt member pivotally connected to said frame and rotatably movable with respect to said frame between an uncocked and a cocked position, a bolt actuating means pivotally connected to said frame and operable to resiliently urge said bolt into one of these positions, said bolt actuating means including a spring biased cam element constantly in engagement with a portion of said bolt member, said cam element including a plate having a cambered surface portion and bolt engaging means, said bolt having an arcuately-shaped surface adapted to rollably contact the cambered surface of the cam element as the bolt moves into and out of the cocked position and including means cooperating with the engaging means of said cam element to maintain these surfaces in substantial working relationship.

9. In a mechanism of the type described, a supporting frame, a bolt member pivotally connected to said frame and rotatably movable with respect to said frame between at least two predetermined positions, a bolt actuating means pivotally connected to said frame and operable to resiliently urge said bolt into one of its predetermined positions, said bolt actuating means including a spring biased cam element constantly in engagement with a portion of said bolt member, the cam element including a plate having a cambered bolt-engaging surface portion with a plurality of adjacent protuberances extending therefrom, said bolt member being adapted to receive and be operably engaged by the protuberances and having an arcuately shaped surface which is adapted to operably and rollably contact the cambered surface of the cam element as the bolt moves into and out of at least one of its predetermined positions.

10. In a mechanism of the type described, a supporting frame having side walls which are provided with oppositely disposed apertures into which extend protuberant V-portions, a bolt member pivotally connected to said frame and rotatably movable with respect to said frame between at least two predetermined positions, a spring biased bolt actuating means pivotally connected to said frame and operable to resiliently urge said bolt into one of its predetermined positions, said actuating means including a spring pivot plate having lateral flanges which are adapted to extend through the apertures in the opposing side walls of said frame and to operatively engage and pivot upon the protuberant V-portions of the side walls extending within the apertures.

11. In a mechanism of the type described, a supporting frame having walls which are provided with oppositely disposed apertures into which extend protuberant V-portions, a bolt member pivotally connected to said frame and rotatably movable with respect to said frame between at least two predetermined positions, a bolt actuating means pivotally connected to said frame and operable to resiliently urge said bolt into one of the predetermined positions, said bolt actuating means including a coil spring, a bolt-engaging cam plate, and a spring pivot plate, said spring pivot plate having flange portions which laterally extend through the apertures in the opposing walls of said frame and are adapted to operatively engage and pivot upon the protuberant V-portions extending within the apertures of said frame walls.

12. In a mechanism of the type described, a supporting frame having walls which are provided with oppositely disposed apertures into which extend protuberant V-portions, a bolt member pivotally connected to said frame and rotatably movable with respect to said frame between at least two predetermined positions, a bolt actuating means pivotally connected to said frame and operable to resiliently urge said bolt into one of the predetermined positions, said bolt actuating means including a coil spring, an actuator shaft adapted to guide said spring, a bolt engaging cam connected to said shaft and having a spring-abutting shoulder portion, a spring pivot plate on which said actuator shaft is slidably mounted having a hole within which the actuator shaft is adapted to slide, said spring pivot plate having flange portions which laterally extend through the apertures in the opposing walls of said frame and are adapted to operatively engage and pivot upon the protuberant V-portions extending within the apertures of said frame walls.

13. In a mechanism of the type described, a supporting frame having walls which are provided with oppositely disposed apertures into which extend protuberant V-portions, a bolt member pivotally connected to said frame and rotatably movable with respect to said frame between at least two predetermined positions, a bolt actuating means pivotally connected to said frame and operable to resiliently urge said bolt into one of the predetermined positions, said bolt actuating means including a coil spring, a bolt-engaging cam plate, and a spring pivot plate, said spring pivot plate having flange portions which laterally extend though the apertures in the opposing walls of said frame and are adapted to operatively engage and pivot upon the protuberant V-portions extending within the apertures of said frame walls, said spring being compressed between said cam plate and said pivot plate to maintain said cam plate in constant engagement with said bolt and said pivot plate in constant engagement with the protuberant V-portions of said frame.

14. In a mechanism of the type described, a supporting frame having walls which are provided with oppositely disposed apertures into which extend protuberant V-portions, a bolt member pivotally connected to said frame and rotatably movable with respect to said frame between at least two predetermined positions, a bolt actuating means pivotally connected to said frame and operable to resiliently urge said bolt into one of the predetermined positions, said bolt actuating means including a coil spring, an actuator shaft adapted to guide said spring, a bolt engaging cam connected to said shaft and having a spring-abutting shoulder portion, a spring pivot plate on which said actuator shaft is slidably mounted having a hole within which the actuator shaft is adapted to slide, said actuator shaft adapted to be inserted within the central aperture of said coil spring, said spring pivot plate having flange portions which laterally extend through the apertures in the opposing walls of said frame and are adapted to operatively engage and pivot upon the protuberant V-portions extending within the apertures of said frame walls, said spring being compressed between said bolt engaging cam and said pivot plate to maintain said bolt engaging cam in constant engagement with said bolt and said pivot plate in constant engagement with the protuberant V-portions of said frame.

15. In a latch mechanism of the nonlocking type which is adapted to receive and exert a draw-in and holding force upon a keeper, a supporting frame, a bolt member pivotally connected to said frame and rotatably movable with respect to said frame between at least two predetermined positions, said bolt member including an arcuately shaped keeper-engaging element, the arc of said element being generated from a point which when the bolt is in the keeper engaging position is located substantially on that line which is normal to the direction of desired keeper draw-in and holding force and which passes through the pivotal axis of said bolt, whereby the holding forces acting on the fully latched keeper through said element will be constant regardless of the location of the point of engagement between the cam surface and the keeper.

16. In a latch mechanism, having a bolt which is adapted to rotatably move about a pivotal axis and to receivingly engage and exert upon a keeper a draw-in and holding force which passes through a point exterior of the pivotal axis of the bolt, an improved bolt having a keeper-receiving slot and an adjacent arcuately shaped keeper-engaging surface, the arc of the surface being struck from a point which when the bolt is in the keeper-engaging position is located substantially on the line which is normal to the direction of desired keeper draw-in and holding force and which bisects the pivotal axis of said bolt, whereby the holding forces acting on the fully latched keeper through the surface of said bolt will be constant regardless of the position of the keeper within the receiving slot of said bolt.

17. In a latch mechanism, having a bolt which is adapted to rotatably move about a pivotal axis and to receivingly engage and exert upon a keeper a draw-in and holding force which passes through a point exterior of the pivotal axis of the bolt, an improved bolt having a keeper-receiving slot and an adjacent arcuately shaped keeper-engaging surface, the arc of the surface being struck from a point which when the bolt is in the keeper engaging position is located substantially on the line of desired draw-in and holding force at approximately the intersection of that line with the line which is normal thereto and intersects the pivotal axis of said bolt, whereby the holding forces acting on the fully latched keeper through the surface of said bolt will be constant regardless of the position of the keeper within the receiving slot of said bolt.

18. In a mechanism in the type described, a supporting frame, a bolt member, and an actuating member pivotally connected to said supporting frame, said actuating member having a portion in rollable engagement with a portion of said bolt member and effective to resiliently and selectively urge said bolt member into at least two alternative positions, the engaging portion of one of said members including a cam surface and the engaging portion of the other of said members including a cooperating surface, the contours of said cam surface and said cooperating surface being determinative of the energy release of said actuating means in at least one of said positions.

19. In a mechanism of the type described, a supporting frame having two spaced substantially V-shaped protuberances, a bolt member pivotally connected to said frame and rotatably movable with respect to said frame between at least two predetermined positions, a bolt actuating means pivotally connected to said frame and operable to resiliently urge said bolt into at least one of the predetermined positions, said bolt actuating means including a coil spring, a bolt engaging element and means for guiding said spring, said V-shaped protuberances being adapted to operatively and pivotally support said spring, and said spring being compressed between said bolt engaging element and said protuberances to maintain said element in constant engagement with said bolt.

References Cited in the file of this patent
UNITED STATES PATENTS

| | | |
|---|---|---|
| 652,828 | Bailey | July 3, 1900 |
| 755,923 | O'Saughnessy | Mar. 29, 1904 |
| 847,909 | Conklin | Mar. 19, 1917 |
| 1,229,804 | Stanfield | June 12, 1917 |
| 1,269,467 | Leonard et al. | June 11, 1918 |
| 1,335,958 | Farr | Apr. 6, 1920 |
| 1,675,176 | Jarecki | June 26, 1928 |
| 1,676,515 | Anstey | July 10, 1928 |
| 1,873,560 | Ekman | Aug. 23, 1932 |
| 2,129,926 | Geske et al. | Sept. 13, 1938 |
| 2,355,895 | Roberts | Aug. 15, 1944 |
| 2,490,060 | Jacobson | Dec. 6, 1949 |
| 2,833,578 | Burke | May 6, 1958 |

FOREIGN PATENTS

| | | |
|---|---|---|
| 243,625 | Germany | Feb. 20, 1912 |